United States Patent [19]
Henderson

[11] 3,989,473
[45] Nov. 2, 1976

[54] METHOD FOR PELLETING CARBON BLACK

[75] Inventor: Eulas W. Henderson, Toledo, Ohio

[73] Assignee: Phillips Petroleum Company, Bartlesville, Okla.

[22] Filed: Dec. 2, 1974

[21] Appl. No.: 528,767

Related U.S. Application Data

[63] Continuation-in-part of Ser. No. 298,659, Oct. 18, 1972, abandoned.

[52] U.S. Cl. .................................. 23/314; 425/222
[51] Int. Cl.$^2$ ...................... C09C 1/58; C09C 1/60
[58] Field of Search .............. 23/314, 313; 264/117; 425/222

[56] References Cited

UNITED STATES PATENTS

| | | | |
|---|---|---|---|
| 1,141,169 | 6/1915 | Biesanz | 23/313 |
| 2,164,164 | 6/1939 | Price | 23/314 |
| 2,327,016 | 8/1943 | Carney | 23/314 |
| 2,601,924 | 7/1952 | Gonder | 209/2 |
| 2,686,161 | 8/1954 | Stewart | 23/313 |
| 2,867,513 | 1/1959 | Boyer | 23/314 |
| 2,867,513 | 1/1959 | Boyer | 23/314 |
| 3,152,005 | 10/1964 | Tuttle | 23/313 FB |
| 3,177,062 | 4/1965 | Hignett | 23/313 |
| 3,239,314 | 3/1966 | Lackett | 23/313 |
| 3,347,638 | 10/1967 | Gerdes, Jr. | 23/314 |

FOREIGN PATENTS OR APPLICATIONS

| | | | |
|---|---|---|---|
| 879,439 | 6/1953 | Germany | 23/314 |

*Primary Examiner*—Stephen J. Emery

[57] ABSTRACT

Apparatus and method for treating particulate material by selectively separating the particles on the basis of size. There is disclosed a process for pelleting a particulate material such as carbon black wherein wet pelleting material is classified and only desired size pellets are passed to a dryer or drying zone.

1 Claim, 3 Drawing Figures

METHOD FOR PELLETING CARBON BLACK

This is a continuation-in-part application of copending application Ser. No. 298,659 filed Oct. 18, 1972, now abandoned.

It is desirable to treat particulate material by selectively separating the particles on the basis of size. Further, it is often desirable to dry a selected portion of the separated particles, recycle the other selected portions of the wet separated particles, and retreat the particles prior to selective separation thereof.

This invention therefore resides in apparatus and method for treating particulate material by selectively separating the particles on the basis of size.

Other aspects, objects, and advantages of the present invention will become apparent from a study of the disclosure, the appended claims, and the drawing.

The drawing is a diagrammatic view of the apparatus of this invention.

FIG. 1 shows the apparatus of this invention associated with, for example, carbon black processing apparatus. It should be understood, however, that the method and apparatus of this invention can be used with other particulate material and should not be limited to carbon black and the carbon black process.

Figure 2:
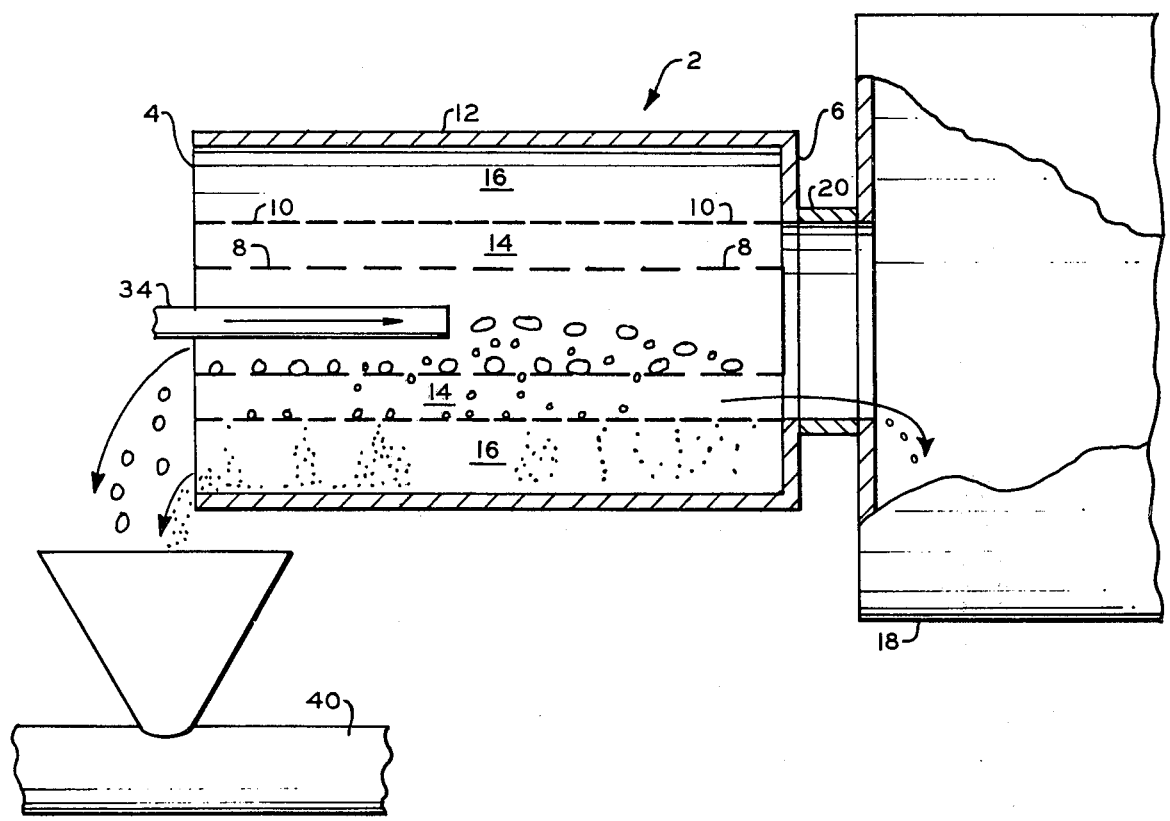
FIG. 2 shows an enlarged view of the separating apparatus.

Referring to FIG. 2, a rotatable separating apparatus 2 has first and second opposed ends 4,6 and at least first and second spaced-apart screen drums connected to and positioned within an outer member 12. The first screen drum 8 is positioned within the second screen drum 10 and the second screen drum 10 is positioned within the outer member 12 forming a first annulus 14 between the first and second screen drums 8,10 and a second annulus 16 between the second screen drum 10 and the outer member 12 with the first screen drum 8 open at only the first end 4, the first annulus 14 open at only the second end 6 and the second annulus 16 open at only the first end 4.

Each of the screen drums is of a different mesh size with the respective mesh numbers increasing in magnitude in a direction from the innermost screen drum 8 toward the outer member 12. For example, the first screen drum 8 is constructed of 10 mesh screen and the second screen drum 10 is constructed of 60 mesh screen.

Figure 1:
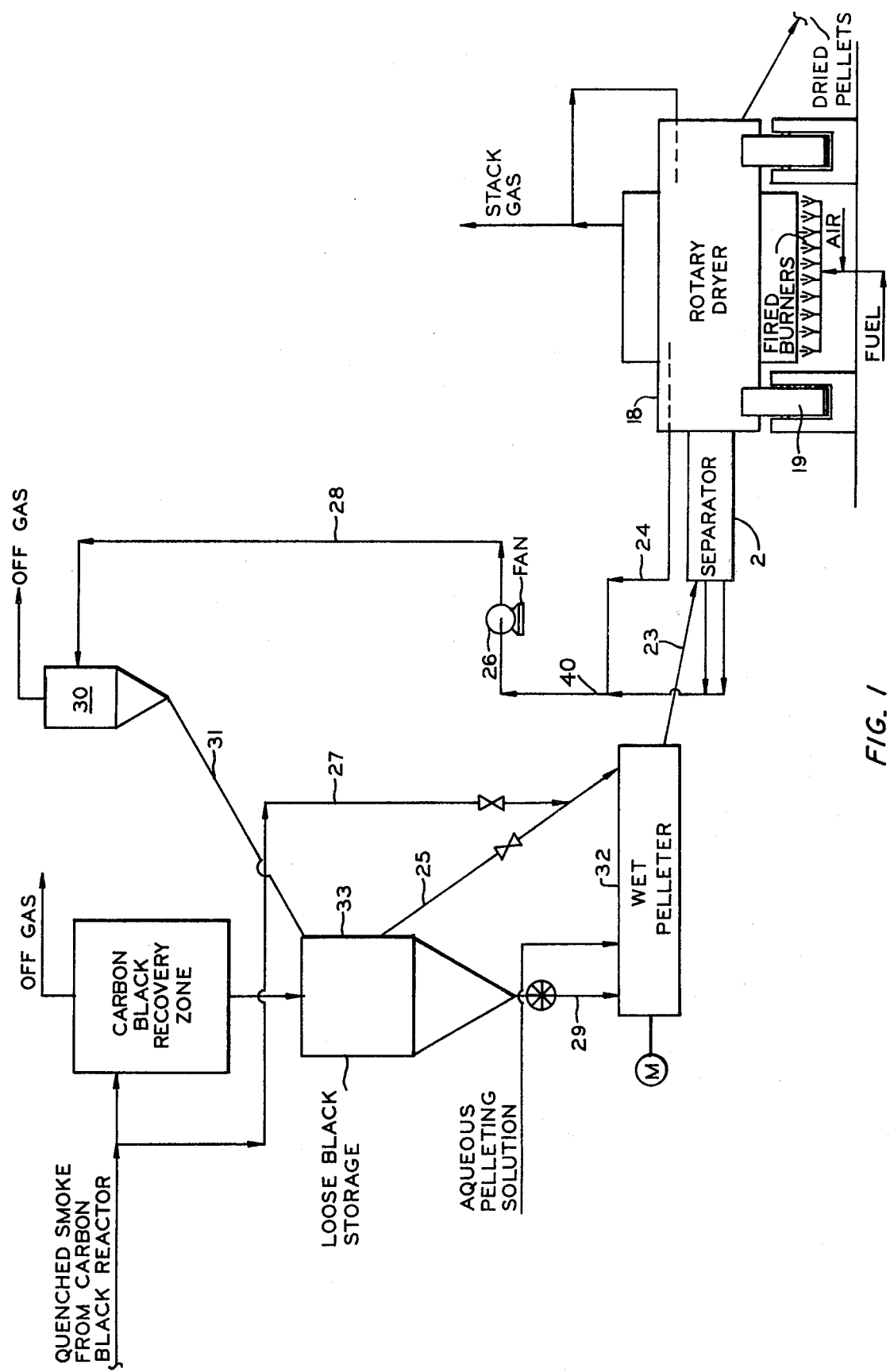
FIG. 1 shows the apparatus of this invention.

The particular mesh sizes selected are dependent upon the size of the particles and the separations desired as will be later more fully described. One particular useful mesh size combination for carbon black particle separation is a first screen drum 8 being of 10 mesh and the second screen drum 10 being about 60 mesh. This allows charging only the desired pellet size, smaller than 10 mesh and larger than 60 mesh to the dryer 18 (FIG. 1). As is known in the art, as the mesh number increases in magnitude the openings through the screen decrease in size. For example, the width of the opening of 10 mesh is 0.066 in. and that of the 60 mesh is 0.0098 in.

The separator apparatus 2 of this invention can be connected to a particle dryer 18 via a collar 20, for example. The second end 6 of the apparatus 2 is connected to the heated rotary dryer 18 thereby positioning the first annulus 14 in communication with the dryer 18. In this construction, wet particles of a preselected size range which pass through the first screen drum 8 and are maintained on the second screen drum 10 pass from the first annulus 14 into the dryer for subsequent drying.

In the preferred embodiment, the dryer 18 is mounted on powered rotating supports 19 for rotating the separating apparatus 2 in response to rotation of the dryer 18, as seen in FIG. 1.

Referring to FIGS. 1 and 2, a purge gas line 24 is in communication at one end to the dryer 18 and at the other end to the section of a purge fan 26.

Oversize and undersize particulate material discharging from the first end 4 of the apparatus 2 can be injected into line 24 for recycling by the purge fan 26 for further processing. These oversize (and undersize) recycled wet pellets are broken up in fan 26, so that the oversize pellets will not continue to build up in size during each cycle, or ultimately only large, oversize pellets would exit from the wet pelleter 32 via conduit 23. In this manner, the oversize and undersize wet pellets are not passed through the dryer, loading the dryer, which is one of the most costly unit operations in carbon black manufacture.

For example, the particulate material injected into line 24 can be recycled via line 28 into a purge gas filter system 30. Separated carbon black is returned to the wet pelleter or mixer 32, preferably by way of conduit 31 and loose or flocculent carbon black storage or surge bin 33. These recycled pellets and flocculent black from bin 33 are passed to the wet pelleter by way of conduit 29. The mixer 32 is connected to line 23 which passes the wet pelleted material into the first screen drum 8. The wet pellets, prior to being discharged from mixer 32 by way of conduit 23 into separator 2 or that of 3, are treated with quenched reactor smoke containing carbon black and/or with flocculent black from bin 33, passed into the mixer 32 by way of conduits 27 and 25, respectively. When the wet pellets, such as wet carbon black pellets, are sticky, it is necessary to treat or coat the sticky pellets with a drying material, such as dry flocculent or loose carbon black, and/or with quenched reactor smoke containing carbon black, prior to charging the pellets to screening, in order to effect proper screening and not to plug the screens with sticky pellets.

Figure 3:
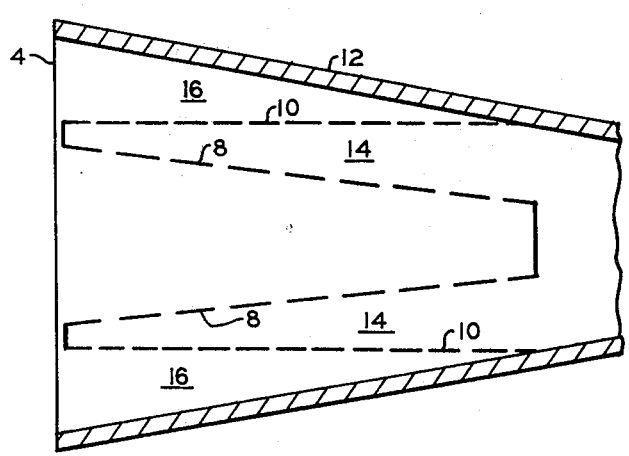
FIG. 3 shows another embodiment of the separating apparatus.

FIG. 3 shows a separating apparatus having screen drums 8,10 of a different configuration. In this embodiment, the first screen drum 8 and the outer member 12 are each of a frusto-conical configuration with the larger end of each being positioned at the first end 4 of the apparatus and with the second screen drum 10 being of a substantially cylindrical configuration. In this construction, the lowermost floors of the first screen drum 8 and the outer member 12 are downwardly, angularly disposed relative to the horizontal in a direction toward the first end of 4. This construction enhances the movement of the particulate material across its supported member for discharge from the apparatus 2. The apparatus 2, shown in FIG. 2, can also be constructed with the first end 4 maintained at a higher elevation than the second end 6 for enhancing the movement of the particulate material. The embodiment shown in FIG. 3 can be constructed and maintained at an attitude such that the discharge end of the first screen drum 8 and the first and second annulus 14,16 are at a lower elevation than their opposed ends.

It should be understood, however, that rotation of the apparatus 2 and buildup of the particles on their respective supporting structure will cause said particles to be discharged from the apparatus even where each screen drum 8,10 and the outer member 12 are of cylindrical configuration and maintained at a horizontal attitude. However, maintaining the supporting floors at an angle $\theta$ with the horizontal in the range of about 5° to about 15° will enhance discharge of the particles. At greater angles than about 20° or more, the particles may not have an opportunity to pass through the screen openings before being discharged from the apparatus. This is particularly true where the apparatus is being charged at high rates.

In the operation of the method of this invention, a stream of particulate material comprised of a multiplicity of different sized particles is directed into the first, innermost screen drum 8 by pipe 34. The drum is rotated for passing the material along the first screen drum 8, passing a first portion of particles (e.g., smaller than 10 mesh) through the first screen drum 8 and causing larger or oversize (e.g., greater than 10 mesh) particles maintained on the first screen drum 8 to be discharged from the first end 4 of the first screen drum 8. The separator, preferably, is a unit attached to the rotating dryer, and members 8, 10, and 12 are rigidly affixed to each other, respectively, so that the separator rotates as a unit.

As the unit is rotating, the second screen drum also is rotating for passing the first portion of particles along the second screen drum 10, passing a second portion of particles through the second screen drum, and causing particles remaining on the second screen drum, the desired particle size range, to be discharged from the second end 6 of said second screen drum 10, preferably into the dryer 18.

Also the outer member 12 is rotated for passing the second portion of particles along the outer member and discharging said second portion from the first end 4 of the apparatus 2. In this construction, the particles being discharged from the second end 6 are within a preselected preferred size range intermediate the particles being discharged from the first end 4 of the apparatus, e.g., smaller than 10 mesh and larger than 60 mesh.

The undesirable size particles discharging from the first end 4 can thereafter be recycled to a purge gas filter, as at 30, incorporated with other formed particles, contacted with a drying agent in the wet pelleter or mixer 32 for drying of the outer surfaces of the particles which inhibit sticking of the particles one to the other and to the apparatus, and thereafter passing into the separating apparatus 2.

In the purge gas filter system and/or other process apparatus to which the recycle particles are passed, e.g., wet pelleter or mixer 32, their size is altered relative to the particle size rejected by the separating apparatus 2.

The method and apparatus of this invention therefore not only selectively separate particle sizes for drying which reduces the expenditures of labor and equipment needed for drying and thereby avoiding waste, but additionally provide an end product having a preselected size range.

While this invention has been described in conjunction with a presently preferred embodiment, it obviously is not limited thereto.

What is claimed is:

1. A method for treating carbon black to obtain pellets within a desired size, said method comprising:
   1. Pelleting a mass of particles;
   2. Classifying the pelleted mass to remove therefrom pellets which are larger than a desired size range and pellets which are smaller than a desired size range, said classifying by:
      a. Directing a stream of pellets comprised of a multiplicity of different sized pellets into a first, innermost screen drum;
      b. Rotating the first screen drum for passing the pellets along the first screen drum;
      c. Passing a portion of the pellets through the first screen drum, and causing larger pellets maintained along the first screen drum to be discharged from the first end of the first screen drum;
      d. Rotating a second screen drum positioned about first screen drum for receiving the first portion of pellets passing through the first screen drum, passing the first portion of pellets along the second screen drum, passing a second portion of pellets through the second screen drum, and causing pellets maintained along the second screen drum to be discharged from the second end of said second screen drum;
      e. Rotating an outer member positioned about said second screen drum for receiving the second portion of pellets, passing the second portion of pellets along the outer member, and discharging said second portion of pellets from the first end of said outer member, said pellets being discharged from the second end of the second screen drum being of a preselected size range intermediate the pellets being discharged from the first end; and
      f. Passing the pellets discharged from the second end of the second screen drum into a dryer wherein said pellets discharged from the second end of the second screen drum are dried;
   3. Passing the remaining pellets, said pellets being of the desired size range, to a drying zone;
   4. Recycling said pellets which are larger than the desired size and pellets smaller than the desired size range to the pelleting operation with the aid of a gas taken from a drying zone in a manner to cause disintegration of the pellets; and
   5. Repelleting the recycled material.

* * * * *